July 31, 1923.
W. E. WARD ET AL
1,463,641
WOOD AND OTHER PULLEY
Filed Oct. 6, 1922
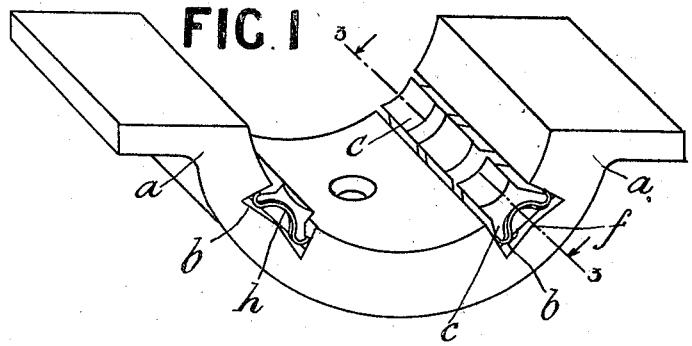
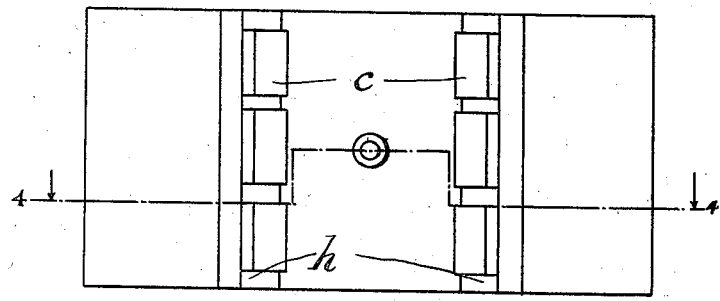
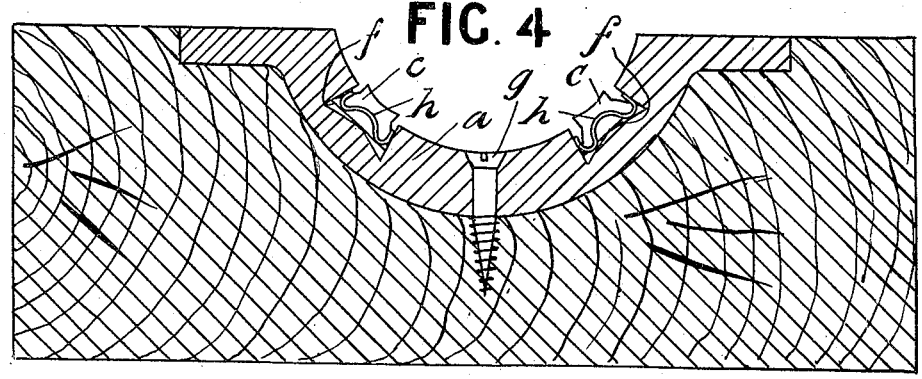
Inventors:
William Ernest Ward
Marius Jules Barre
By Kent W. Brownell Atty Patented July 31, 1923.

1,463,641

UNITED STATES PATENT OFFICE.

WILLIAM ERNEST WARD AND MARIUS JULES BARRE, OF BIRMINGHAM, ENGLAND.

WOOD AND OTHER PULLEYS.

Application filed October 6, 1922. Serial No. 592,899.

*To all whom it may concern:*

Be it known that we, WILLIAM ERNEST WARD, of 109 Gladstone Road, Sparkbrook, Birmingham, and MARIUS JULES BARRE, 15 Constitution Hill, Birmingham, England, both subjects of the King of Great Britain, have invented certain new and useful Improvements in and Relating to Wood and Other Pulleys (for which we have filed application in Great Britain July 12, 1921, No. 18,791), of which the following is a specification.

This invention has reference to improvements in and relating to wood and other pulleys, and comprises an improved gripping bush for rigidly securing or attaching the pulleys onto shafts.

The improved gripping bush comprises a pair of complementary bush members or parts having means for preventing its rotation relatively to the pulley, and provided in their inner periphery with one or more longitudinal grooves in which tilting blocks formed with a pair of inwardly projecting cutting edges are disposed so as to grip the shaft in a very effective manner.

In the case of wood pulleys the two parts of the bush can be flanged at their ends to engage the pulley halves, and in all cases the grooves are preferably dovetailed with a convex face, while the tilting blocks are formed with tapered sides and have a concave face presenting a pair of sharp edges to the shaft.

In the drawings, we have illustrated a device made in accordance with our invention.

Figure 1, shows one half of the bush in perspective.

Figure 2, is a plan thereof.

Figure 3, is a section on line 3—3 of Figure 1, taken in the direction of the arrows.

Figure 4, is a section on line 4—4 of Figure 2 and showing the bush mounted in the pulley.

Figure 5, is an enlarged perspective view of the protruding blocks seen in the other figures.

The improved gripping bush comprises a pair of members $a$ as shown at Figure 1. They are each formed with a pair or more of recesses or grooves $b$ in a direction parallel with the axis, these grooves being preferably dovetail shaped as shown to retain the tilting block $c$ therein.

Within these grooves are disposed tilting blocks $c$ having an inwardly projecting concave surface $d$ forming a pair of sharp edges $e$ for gripping a shaft. The radius of the curve of the concave surface of the blocks aforesaid is smaller than that of the shaft and this difference between the radii of the curves has the effect of allowing the edges of the steel block to project inwardly of the bush, and form angular contacting members adapted to grip the shaft.

The steel blocks $c$ may be held in position by expanding clips $h$ which are pressed into the dovetail recesses to retain the blocks against lateral sliding action before the pulley is mounted on its shaft.

The steel keying blocks are slightly loose in their recesses or housings and capable of tilting on the convex or ridged bottom $f$ of the groove, and under a driving strain they are engaged at one end and rocked or tilted so as to direct their other ends more steeply into the shaft, and indent it so as to increase the grip as the load on the pulley increases. By this means slipping of the pulley on its shaft is entirely eliminated.

In use the bush parts are permanently secured to the pulley halves by a screw or like member $g$, and carry the steel blocks in the dovetail recesses.

By screwing up or bolting the pulley halves together in the ordinary manner, the said improved bushes are caused to grip the shaft.

We claim:—

1. A bush for securing wood and other pulleys upon shafting, comprising a bush formed in two complementary portions, longitudinal recesses in the inner face of the said portions, blocks located in the said recesses and having inwardly projecting cutting edges, and means for causing the said blocks to tilt within the said recesses.

2. A bush for securing wood and other pulleys upon shafting, comprising a bush formed in two complementary portions, longitudinal recesses in the inner face of the said portions, blocks located in the said recesses and having inwardly projecting cutting edges, and means for causing the said blocks to tilt within the said recesses, the said means comprising outwardly convex inner faces formed in the recesses.

3. A bush for securing wood and other pulleys upon shafting, comprising a bush formed in two complementary portions, longitudinal recesses in the inner face of the said portions, blocks located in the said recesses and having inwardly projecting cutting edges, and means for causing the said blocks to tilt within the said recesses, the cutting edges on the said blocks being provided by forming the blocks with concave inner faces, the radius of the concavity being less than the radius of the shafting upon which the bush is to be fitted.

4. A bush for securing a pulley to a shaft, having a longitudinal recess with a centrally ridged bottom, a block having inwardly projecting cutting edges and a bottom seated in the recess and adapted to tilt on the ridged bottom.

5. A bush for securing a pulley to a shaft, having a longitudinal dovetailed recess, and a corresponding block seated therein having inwardly projecting cutting edges, the bottoms of the block and recess being inclined oppositely so that the block will tilt therein to grip a shaft more securely.

6. In a bush for securing a pulley to a shaft, complementary portions each formed with a dovetailed recess, a plurality of blocks with dovetailed bottoms and with outer cutting edges, the bottoms of the block and recess being formed to tilt the blocks therein for gripping a shaft more securely, and a clip in the recess for retaining the blocks in place.

In testimony whereof we affix our signatures.

WILLIAM ERNEST WARD.
MARIUS JULES BARRE.